June 3, 1930.   H. O. STOUFFER   1,761,851
SIGHT LEVEL
Filed Feb. 3, 1928
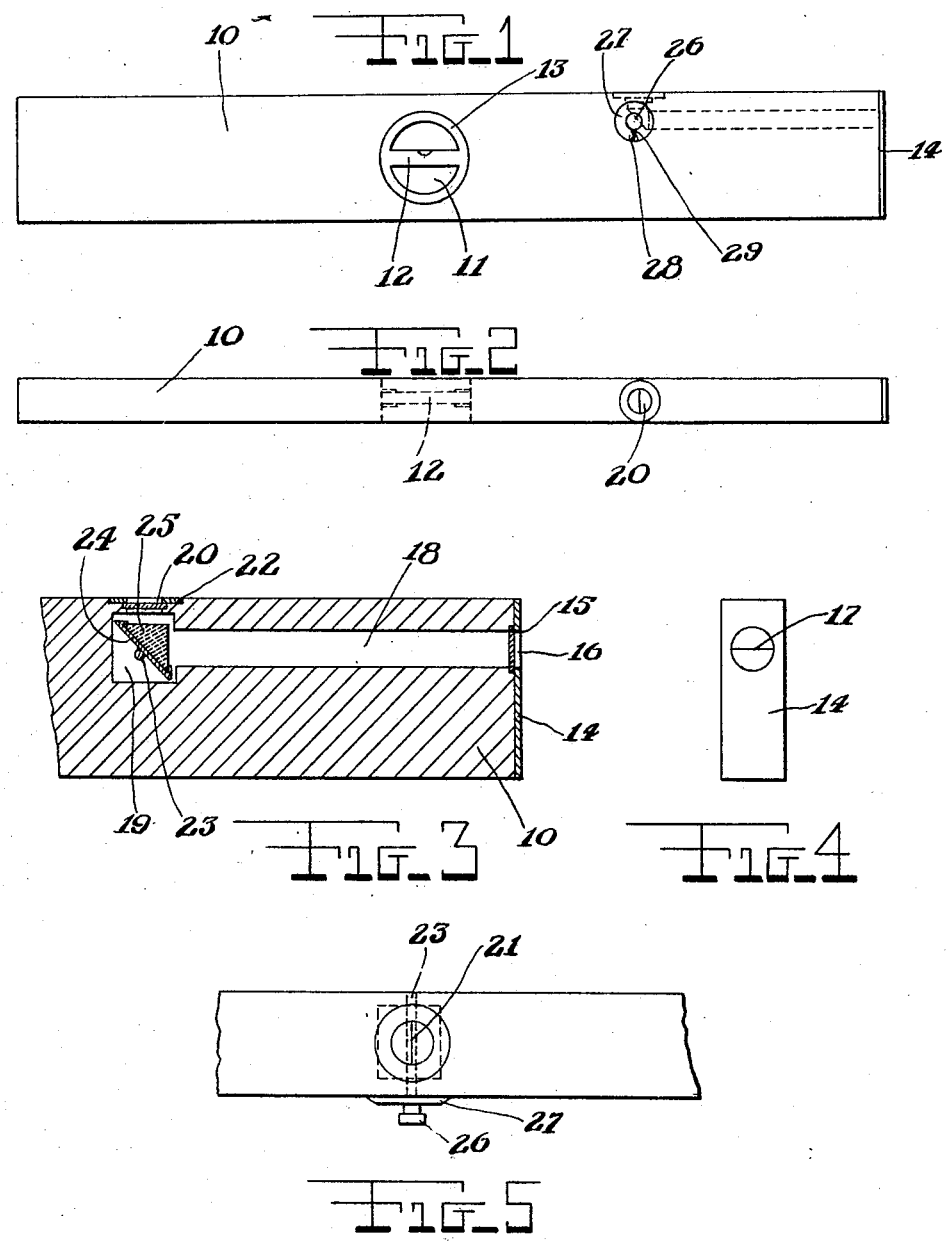
INVENTOR
*H.O.Stouffer*
BY *F. Ledermann*
ATTORNEY Patented June 3, 1930

1,761,851

UNITED STATES PATENT OFFICE

HOWARD O. STOUFFER, OF WATSONTOWN, PENNSYLVANIA

SIGHT LEVEL

Application filed February 3, 1928. Serial No. 251,473.

The main object of this invention is to provide a leveling bar in which is provided a line sight which has for its purpose to indicate a line on the same level with the sight at a point distant therefrom.

Another object of the invention is to provide a leveling bar having a channel therein in which a prism or other reflecting surface is mounted, the prism being movably mounted so that angles or horizontal lines may be sighted thru the reflecting surface.

The above and other objects will become apparent in the description below in which characters of reference refer to like-named parts in the drawing.

Referring briefly to the drawing, Figure 1 is a front elevational view of the leveling bar showing the means mounted thereon for adjusting the prism.

Figure 2 is a top plan of Figure 1 showing the eyelet end of the sight.

Figure 3 is an enlarged sectional elevational view showing the sight in detail.

Figure 4 is an end elevational view of Figure 4 showing the object end of the sight.

Figure 5 is an enlarged top plan view of a section of the leveling bar showing the prism moving mechanism.

Referring in detail to the drawing, the numeral 10 indicates the rectangular body of the level which may be composed of wood or any other suitable material. Intermediate the length of the body an annular opening 11 is formed in which a ring 13 is mounted. The ring has the both ends of a horizontally positioned spirit bubble 12 mounted therein. This spirit bubble is aligned with both of the longitudinal surfaces of the body and is used to indicate the leveling of these surfaces.

The end of the body has a plate 14 mounted thereon. This plate serves as a heel and is provided with an opening 16 which exposes an object glass 15 which is provided with a horizontal hair line 17. This object glass is transparent and closes one end of a circular channel 18 which has at its inner end a compartment 19 which is substantially square in shape. A passageway communicates with the compartment 19 and is positioned at right angles to the channel 18. The passageway is covered by a transparent glass 20 which has a hair line 21 formed thereon which latter is adapted to align with the hair line 17 on the object glass. The eye glass 20 is retained in position by a retainer plate 22 which is embedded in the long side surface of the body 10.

A stud passes thru the compartment 19 and is indicated by the numeral 23. This stud is rotatable and supports an angular table 24 intermediate its length. The table has lips thereon which are adapted to retain a transparent prism seated firmly on the table, the prism being indicated by the numeral 25. The one end of the stud 23 projects outwardly from the side of the body 10 and this projecting end has a knob 26 thereon which seats on a disk 27. The latter has a plurality of radial graduations 28 formed at one position thereon. The knob 26 has a finger 29 projecting radially therefrom which constantly lies in frictional contact with the disk and thru such frictional contact releasably secures the prism in position.

The leveling bar is adapted to be used as a periscopic line sight for the purpose of indicating at a point distant aligned with the hair line of both the object and the eye glass. When the leveling bar is placed upon a surface and leveled and at a point distant a rod is raised in sight of the object glass, a level line will be indicated on the rod when the hair lines of both the eye and object glass are aligned and sighted thru. By turning the knob 26 and moving the flexible finger to the desired graduation angular lines may be sighted in the same manner as horizontal lines.

It is to be noted that certain changes in form and construction may be made without departing from the spirit and scope of the invention.

I claim:

A device of the class described comprising a leveling bar having a longitudinal channel, a compartment at the inner end of said channel and a passageway communicating with the compartment at right angles to the channel, an eye glass covering the passageway, an object glass covering the channel, said eye and object glass having a hair line thereon, a reflecting prism in said compartment, a table rotatably supporting said prism, a stud having said table mounted thereon, the axis of said stud being aligned with the reflecting surface of said prism, a graduated disk rigidly mounted on said body, said stud passing thru said disk, a knob on said stud, and a resilient finger on said knob in frictional contact with the disk for positioning the prism in adjusted position.

In testimony whereof I affix my signature.

HOWARD O. STOUFFER.